United States Patent Office 3,427,043
Patented Feb. 11, 1969

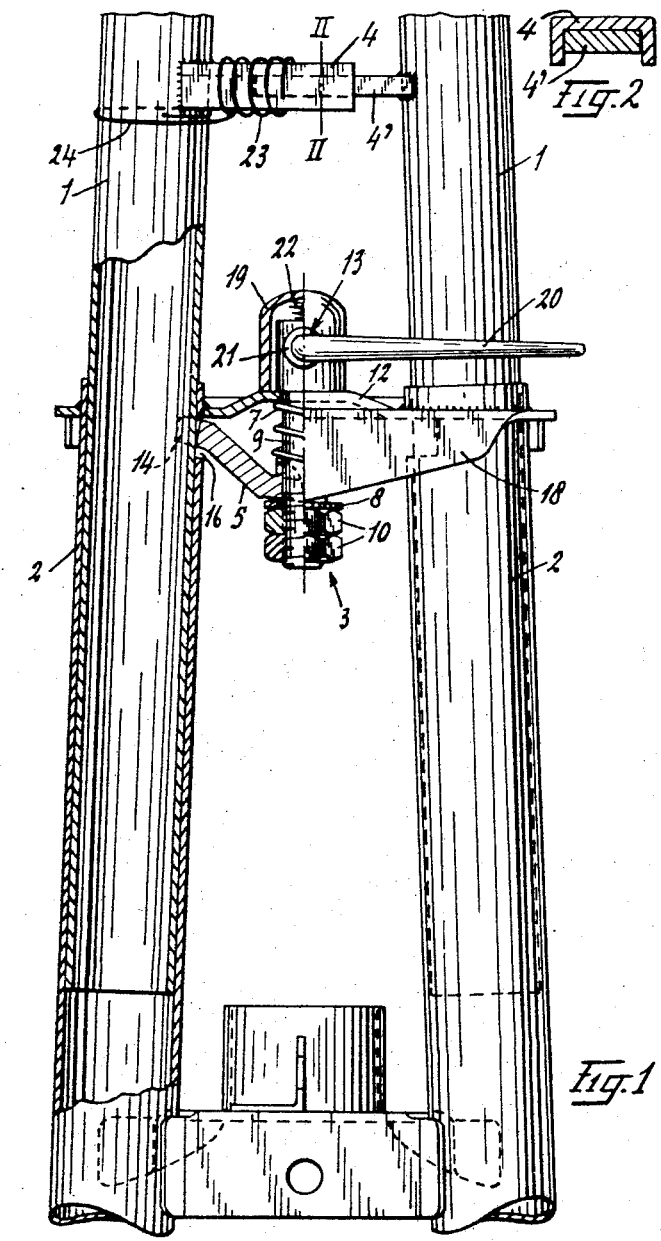

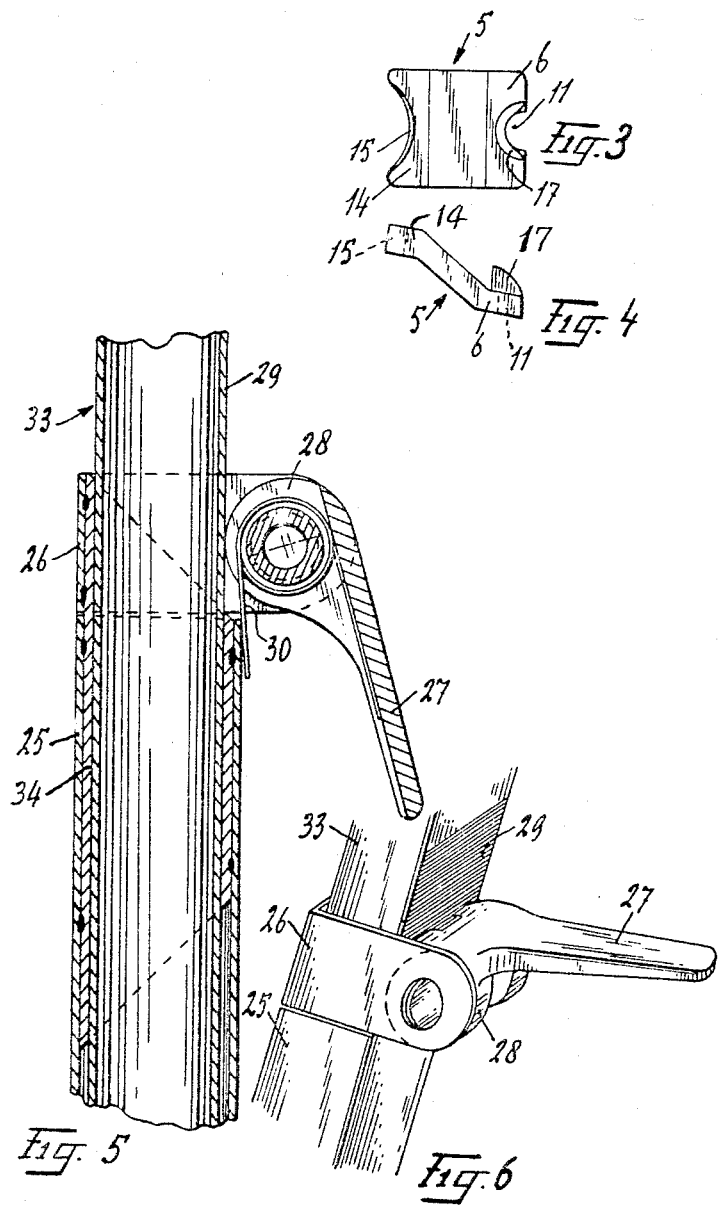

3,427,043
FOLDABLE OR KNOCKDOWN BICYCLE ARRANGEMENT
Willem Oskam, Weesp, and Jacobus Wilhelmus van Dijk, Bussum, Netherlands, assignors to Magneet Rijwielen- en Motorenfabriek N.V., Weesp, Netherlands, a Dutch company
Filed Feb. 1, 1967, Ser. No. 613,344
Claims priority, application Netherlands, Feb. 2, 1966, 6601305
U.S. Cl. 280—278　　　　　　　　　　　14 Claims
Int. Cl. B62k 17/00, 21/16

ABSTRACT OF THE DISCLOSURE

A bicycle, in particular a foldable and/or easily dismountable bicycle provided with disconnectable locking means for simultaneously locking or releasing two separate handle bar portions with respect to their respective front fork tubes and/or with disconnectable locking means mounted on the upstanding frame tube which guides the saddle pin and engaging said saddle pin, said last-mentioned locking means not only preventing downward axial movement of the saddle pin with respect to the upstanding frame tube but allowing an upward axial movement of the saddle pin with respect to the upstanding frame tube.

---

The invention relates to a bicycle, in particular a foldable and/or easily dismountable bicycle.

Bicycles are usually provided with a single handle bar which is mounted in a front fork tube and which is locked in this front fork tube by disconnectable locking means, which are normally in operative position but which may be released in order to adjust the height of the handle bar or, in the case of a dismountable bicycle, to remove the handle bar. However, bicycles, in particular of the easily dismountable type, are known which comprise two separate handle bar portions which are each mounted in a front fork tube.

It is a first object of the present invention to provide disconnectable locking means for simultaneously locking or releasing the two separate handle bar portions of a bicycle of the last mentioned type with respect to their respective front fork tubes.

It is a further object of the present invention to provide disconnectable locking means of the above type which are of a simple construction and easy to actuate.

It is another object of the invention to provide a disconnectable locking means for locking two separate handle bar portions with respect to their front fork tubes which remain fully reliable, even after many years of use.

According to the invention a bicycle, in particular a foldable and/or easily dismountable bicycle, comprising two separate handle bar portions which are each mounted in an associated front fork tube and which are locked against axial displacement in the associated front fork tubes by disconnectable locking means, is characterized in that said locking means consist of two cooperating clamping plates having adjacent end portions which are subjected to spring pressure and which rest on a supporting surface of a common actuating element, which is slidably mounted in a bracket connected to said front fork tubes and which is displaceable between two end positions along a path approximately coinciding with the axis of symmetry of said front fork tubes, while each of the said clamping plates extends from said support surface in an inclined direction so as to enclose an acute angle with said axis of symmetry and extends through a slot in the associated front fork tube, and the end portion of each clamping plate remote from said supporting surface engages an abutment connected with the associated front fork tube and exerts a clamping pressure on the associated handle bar portion in one of the end positions of said actuating element, but disengages said handle bar portion in the other end position of said actuating element.

The invention will now be further explained by reference to the drawings.

FIG. 1 is a front view, partly in section, of parts of the handle bar portions and of the front fork tubes of a bicycle according to the invention.

FIG. 2 is a section along the line II—II in FIG. 1.

FIG. 3 is a plan view of one of the clamping plates according to FIG. 1.

FIG. 4 is a side view of the clamping plate according to FIG. 3.

FIG. 5 is a sectional view of a part of the saddle pin and of the cooperating upstanding frame tube of a bicycle according to the invention.

FIG. 6 is a perspective view of a part of the saddle pin and of the cooperating upstanding frame tube according to FIG. 5.

FIG. 1 shows a part of a bicycle, in particular a foldable and/or easily dismountable bicycle, which comprises two handle bar portions 1 which are each inserted with their lower part in a front fork tube 2 which is open at its upper end.

An axial displacement of the handle bar portions 1 with respect to their respective front fork tubes 2 is normally prevented by disconnectable locking means 3 which will be described hereafter in further detail.

A rotation of the handle bar portions 1 in their respective front fork tubes 2 is normally prevented by cooperating stop means constituted by a lateral strip 4' which is welded to one of the handle bar portions 1 and which, in its normal working position, rests in a matching recess formed in a lateral stop bar 4 which is welded to the other handle bar portion 1 and which is U-shaped in cross section. As shown in FIG. 2 the legs of the stop bar 4 act as stops for the strip 4' and prevent rotation of the handle bar portions 1 in their fork tubes 2.

A helical spring 23 is connected by means of a bent end winding 24 to the handle bar portion 1 which carries the lateral locking bar 4. This spring 23 surrounds with its further windings the locking bar 4 and the strip 4' engaged therewith.

The locking means 3 comprises two cooperating clamping plates 5 (FIGS. 3 and 4) which have adjacent bent end portions 6, which are pressed by a compression spring 7 against a supporting ring 8 mounted on a bolt 9 and carried by nuts 10 screwed on the bolt 9. The bolt 9 extends through approximately semi-circular recesses 11 in the end portions 6 of the clamping plates 5 and is guided by a transverse bracket 12 connected to both front fork tubes 2. This bracket 12 also acts as an abutment for the compression spring 7.

The bracket 12 supports an eccentric 13, which engages the end portion of the bolt 9 remote from the nuts 10 and which, upon actuation, effects a longitudinal displacement of the bolt 9. As shown in FIG. 1 the bolt 9 coincides with the axis of symmetry of the front fork tubes 2 and is displaceable approximately along this axis of symmetry in upward and downward direction between two end positions.

Each clamping plate 5 extends from its bent end portion 6 to the associated front fork tube 2 and engages the associaed handle bar portion 1 with its other end portion 14 through a slot 16 in the associated front fork tube 2. The end portion 14 of each clamping plate 5 is also bent and extends approximately parallel with the end portion 6 (FIG. 4). The intermediate portion of each clamping plate 5 encloses an acute angle with the axis of symmetry of the front fork tubes 2, which angle opens upwardly. The end portions 14 are each provided with a recess 15 which cooperates with the associated handle bar portion 1.

In the position of the locking means 3 as shown in FIG. 4 the clamping plates 5 are in their clamping position wherein the end portions 14 of the clamping plates 5 rest against the bracket 12 (or as an alternative, against the upper edge of the associated slot 16) and exert a clamping pressure on the handle bar portions 1, which prevents an axial displacement of the handle bar portions 1 in the associated front fork tubes 2.

At the same time, the strip 4' engages the stop bar 4 so that a rotational movement of the handle bar portions 1 in the associated front fork tubes 2 is also prevented.

By actuating the eccentric 13 by means of its handle 20, the bolt 9 may be displaced in downward direction; this displacement is followed by the nuts 10, the supporting ring 8 and the end portions 6 of the clamping plates 5, which are kept in engagement with the supporting ring 8 by means of the compression spring 7. In this manner the clamping pressure exerted by the end portions 14 of the clamping plates 5 on the handle bar portions 1 is released.

As shown in FIG. 4, the end portions 6 of the clamping plates 5 are provided with upwardly directed claws 17 which are surrounded under tension by the adjacent end windings of the compression spring 7. Therefore, the spring 7 also exerts a torque on the clamping plates 5. Thus, when the bolt is displaced in downward direction, the compression spring 7 effects a reduction of the acute angle between the clamping plates 5 and the axis of symmetry of the front fork tubes 2, so that the end portions 14 of the clamping plates 5 are slightly tilted away from the handle bar portions 1, after which these handle bar portions 1 may be easily displaced in axial direction with respect to the associated front fork tubes.

During an axial displacement of the handle bar portions 1 with respect to the associated front fork tubes 2 in order to adjust the height of the handle bar portions 1, the helical spring 23 maintains the strip 4' and the stop bar 4 in their interengaged position, so that a rotary movement of the handle bar portions 1 with respect to the front fork tubes is prevented and an equal displacement in height of both handle bar portions 1 is ensured.

If the handle bar portions 1 have to be dismounted, or to be placed in their lowermost rest position with the handles turned inwardly so as to take up as little space as possible, the spring 23 is retracted towards the handle bar portion 1 to which it is connected by means of the winding 24 to such extent that the strip 4' is uncovered. The strip 4' may now leave its recess in the stop bar 4, so that the handle bar portions 1 are fully separated.

As shown in FIG. 1, the transverse bracket 12 comprises a depending front portion 18, which increases the rigidity of the bracket 12 and which further hides the locking means 3 from view.

The eccentric 13 is of known construction and is journalled in an end cap 19 which rests on the bracket 12. The eccentric 13 comprises an eccentric tap 21 which is passed through a transverse hole in the bolt 9. This hole is formed in such manner that the bolt 9 obtains an approximately rectilinear axial movement upon actuation of the eccentric 13. A weak pressure spring 22 extends between the end cap 19 and the adjacent end of the bolt 9.

FIGS 5 and 6 show another part of the bicycle according to the invention, viz. the connection of the saddle pin 33 with a cooperating upstanding frame tube 25. The saddle pin 33 is guided in a sleeve 34 which is welded to the inner side of the upper portion of the upstanding frame tube 25. The saddle pin 33, the sleeve 34 and the upstanding frame tube 25 are rectangular in cross-section.

The sleeve 34 comprises a U-shaped upper portion protruding from the open upper end of the upstanding frame tube 25 and having two side portions with inclined upper edges. A bracket 26 is connected to said protruding portion of the sleeve 34 and supports an eccentric 28 which is journalled in the bracket 26 and is provided with a handle 27. The axis of rotation of the eccentric 28 is perpendicular to the central axis of the saddle pin 33 and in parallel with the adjacent side surface 29 of the saddle pin 33 which is left uncovered by the sleeve 34 and which is roughened.

Upon rotation of the eccentric 28 in a direction wherein its side facing the side surface 29 of the saddle pin 33 moves downwardly, the eccentric 28 engages this side surface 29.

A torsion spring 30 which contacts with its one end the upstanding frame tube 25 and with its other end the handle 27 exerts a torque on the eccentric 28, whereby the eccentric is normally kept in slight engagement with the saddle pin 33.

When the height of the saddle has to be adjusted downwardly or the saddle has to be placed from its working position to its lowest position wherein it takes up a minimum of space, the handle 27 is pressed towards the upstanding frame tube 25 against the action of the torsion spring 30, whereby the eccentric 28 is disengaged from the side surface 29 of the saddle pin, so that the saddle may be easily lowered by hand.

The saddle may be lifted without actuation of the handle 27, as the eccentric 28 does not prevent such movement. When a person thereafter mounts the bicycle, a downward pressure is exerted on the saddle, so that the eccentric which is kept in slight engagement with the saddle pin 33 by the torsion spring 30 immediately and forcefully cooperates with the roughened side surface 29 of the saddle pin 33 and prevents a downward movement of the saddle pin 33 with respect to the upstanding frame tube 25.

The invention is not limited to the embodiments shown in the drawings which may be modified in various ways within the scope of the invention.

What we claim is:

1. A bicycle, in particular a foldable and/or easily dismountable bicycle, comprising two spaced front fork tubes having an axis of symmetry, two separate handle bar portions which are each mounted in an associated front fork tube, disconnectable locking means for locking the handle bar portions against axial displacement in the associated front fork tubes, said locking means comprising two cooperating clamping plates having adjacent end portions, a common actuating element for cooperating with said end portions of said clamping plates, spring means urging said end portions against said common actuating element, a bracket connected to said front fork tubes, said common actuating element being displaceable in said bracket between two end positions along a path approximately coinciding with the axis of symmetry of said front fork tubes, each of the said clamping plates having an end portion opposite that which is engaged by said actuating element, each clamping plate having an intermediate section between said end portions which is inclined and forms an acute angle with said axis of symmetry, each said front fork tube having a slot receiving the end portion of the associated clamping plate remote from said actuating element, and abutment means connected with each associated front fork tube engaging the end portion of each clamping plate remote from said actuating element whereby the latter end portion exerts a clamping pressure on the associated handle bar portion in one of the end positions of said actuating element, and disengages said handle bar portion in the other end position of said actuating element.

2. A bicycle according to claim 1, wherein the abutment means is constituted by said bracket.

3. A bicycle according to claim 1, wherein the abutment means comprises an edge of said slot in the associated front fork tube.

4. A bicycle according to claim 1 wherein the acute angles between said sections of the clamping plates and the axis of symmetry of the front fork tubes open upwardly.

5. A bicycle according to claim 1, wherein said adjacent end portions of the clamping plates include upstanding claws, said spring means comprising a helical spring which encloses said claws to exert a torque on said clamping plates.

6. A bicycle according to claim 1 comprising cooperating stop means on said handle bar portions having an engaged position for preventing rotation of the handle bar portions in the associated front fork tubes.

7. A bicycle according to claim 6 further comprising detachable locking means for maintaining said stop means in the engaged position thereof.

8. A bicycle according to claim 1 comprising a laterally extending strip on one of the handle bar portions, a laterally extending stop bar on the other handle bar portion having depending legs forming a U-shaped cross-section adapted to receive said strip in an interengaged position such that the legs of the stop bar extend on both sides of said strip and retain the same to prevent relative rotation therebetween.

9. A bicycle according to claim 8 further comprising a helical spring connected to the handle bar portion carrying the stop bar and having windings surrounding the stop bar which release the strip when the windings are retracted towards said last mentioned handle bar portion.

10. A bicycle according to claim 1 wherein said common actuating element comprises a bolt, said end portions of the plates which engage said actuating element having approximately semicircular recesses receiving said bolt, a nut screwed on said bolt and a supporting ring supported on said nut forming a supporting surface for said end portions of the plates engaged by the actuating element, the latter said adjacent end portions of the clamping plates having upstanding claws, said spring means comprising a helical spring surrounding said bolt and abutting against said bracket to exert said spring pressure on said end portions and enclose said claws to exert a torque on said clamping plates.

11. A bicycle according to claim 10 comprising an eccentric engaging the end portion of said bolt remote from the nut and, upon actuation, effecting longitudinal displacement of said bolt between said end positions.

12. A bicycle according to claim 11 wherein said intermediate section of each plate is inclined in a direction such that the acute angle between the intermediate section and the axis of symmetry opens upwardly, said end portions of each clamping plate being bent with respect to the intermediate inclined portion and extending approximately parallel with each other.

13. A bicycle according to claim 11 wherein said intermediate section of each plate is inclined in a direction such that the acute angle between the intermediate section and the axis of symmetry opens upwardly, and comprising cooperating stop means on said handle bar portions having an engaged position for preventing rotation of the handle bar portions in the associated front fork tubes.

14. A bicycle according to claim 11 wherein said intermediate section of each plate is inclined in a direction such that the acute angle between the intermediate section and the axis of symmetry opens upwardly, and comprising a laterally extending strip on one of the handle bar portions, a laterally extending stop bar on the other handle bar portion having depending legs forming a U-shaped cross-section adapted to receive said strip in an interengaged position such that the legs of the stop bar extend on both sides of said strip and retain the same to prevent relative rotation therebetween, and a helical spring connected to the handle bar portion carrying the stop bar and having windings surrounding the stop bar which release the strip when the windings are retracted towards said last mentioned handle bar portion.

References Cited

UNITED STATES PATENTS

| | | | |
|---|---|---|---|
| 3,295,863 | 1/1967 | Jaulmes | 280—279 X |
| 3,331,617 | 7/1967 | Jacoby | 280—279 |
| 3,337,240 | 8/1967 | Rizzato | 280—281 X |

KENNETH H. BETTS, *Primary Examiner.*

U.S. Cl. X.R.

280—279; 74—551.4